US008252259B2

(12) United States Patent
Seal et al.

(10) Patent No.: US 8,252,259 B2
(45) Date of Patent: Aug. 28, 2012

(54) SURFACTANT INCORPORATED NANOSTRUCTURE FOR PRESSURE DROP REDUCTION IN OIL AND GAS LINES

(75) Inventors: Sudipta Seal, Oviedo, FL (US); William P. Jepson, Orlando, FL (US); Sameer Deshpande, Santa Clara, CA (US); Suresh C. Kuiry, Campbell, CA (US); Swanand D. Patil, Orlando, FL (US)

(73) Assignees: University of Central Florida Research Foundation, Inc., Orlando, FL (US); CC Technologies Laboratories, Inc., Dublin, OH (US)

( * ) Notice: Subject to any disclaimer, the term of this patent is extended or adjusted under 35 U.S.C. 154(b) by 304 days.

(21) Appl. No.: 12/290,501

(22) Filed: Oct. 31, 2008

(65) Prior Publication Data

US 2009/0127505 A1 May 21, 2009

Related U.S. Application Data

(62) Division of application No. 11/181,056, filed on Jul. 14, 2005, now Pat. No. 7,458,384.

(60) Provisional application No. 60/588,097, filed on Jul. 15, 2004.

(51) Int. Cl.
*C01F 17/00* (2006.01)

(52) U.S. Cl. .... 423/263; 423/592.1; 137/13; 252/182.3; 252/182.12

(58) Field of Classification Search ............... 252/182.3, 252/182.12; 502/302; 423/263, 592.1; 977/896; 137/13
See application file for complete search history.

(56) References Cited

U.S. PATENT DOCUMENTS

| | | | | |
|---|---|---|---|---|
| 3,606,899 | A | 9/1971 | Scott | |
| 3,692,676 | A | 9/1972 | Culter et al. | |
| 4,031,014 | A | 6/1977 | Griffin, Jr. | |
| 4,384,089 | A | 5/1983 | Dehm | |
| 4,527,581 | A | 7/1985 | Motier | |
| 4,958,653 | A | 9/1990 | Lowther | 137/13 |
| 5,220,938 | A | 6/1993 | Kley | 137/88 |
| 5,551,472 | A | 9/1996 | McBrayer et al. | |
| 5,896,896 | A | 4/1999 | Rojey | 138/177 |
| 6,368,586 | B1 | 4/2002 | Jacob et al. | |
| 6,387,981 | B1 | 5/2002 | Zhang et al. | |
| 6,413,489 | B1 | 7/2002 | Ying et al. | |
| 6,649,156 | B1 | 11/2003 | Chane-Ching | |
| 6,732,766 | B2 | 5/2004 | Charron | 138/177 |
| 6,869,584 | B2 | 3/2005 | Ying et al. | |
| 2002/0110519 | A1 * | 8/2002 | Ying et al. | 423/600 |

OTHER PUBLICATIONS

Lee et al., Crystallization behavior of nano-ceria powders by hydrothermal synthesis using a mixture of H2O2 and NH4OH, 2003, Materials letters, 58, 390-393.*

* cited by examiner

*Primary Examiner* — Stanley S. Silverman
*Assistant Examiner* — Pritesh Darji
(74) *Attorney, Agent, or Firm* — Brian S. Steinberger; Joyce Morlin; Law Offices of Brian S. Steinberger, P.A.

(57) ABSTRACT

Nano-sized rare earth metal oxide particles are prepared from aqueous reverse micelles. The engineered nanoparticles have large surface area to volume ratios, and uniformly incorporate a surfactant in each particle, so that when applied to the inner surface of a pipeline or sprayed onto a fluid stream in a pipeline, the particles reduce the roughness of the inside surface of pipe being used to transport fluid. The application of a nanolayer of this novel nanoceria mixture causes a significant reduction in pressure drops, friction, and better recovery and yield of fluid flowing through a pipeline.

20 Claims, 7 Drawing Sheets

SURFACTANT INCORPORATED NANOSTRUCTURE FOR PRESSURE DROP REDUCTION IN OIL AND GAS LINES

This is a divisional of U.S. patent application Ser. No. 11/181,056 filed Jul. 14, 2005, now U.S. Pat. No. 7,458,384 which claims the benefit of priority to U.S. Provisional Patent application Ser. No. 60/588,097 filed on Jul. 15, 2004.

FIELD OF THE INVENTION

This invention relates to the control of pressure drop in fluid flow technology and more particularly to a method and composition of matter for reducing friction or pressure drop in oil and gas pipelines and similar processing structures using surfactant incorporated functional nano particles.

BACKGROUND AND PRIOR ART

The chemical industry and the petroleum industry use pipes, commonly called "pipelines" or "oil and gas pipelines" for conveying gas, water, chemical reagents, petroleum effluents, and the like, over long distances. It is well known that friction or "drag" between the fluids and the pipe or vessel wall causes substantial pressure drops as the fluids move along each wall. The drag experienced by flowing fluids in a pipeline has been directly related to the "roughness" of the inner wall of the pipeline and the roughness of interface between the liquid and gas. At the pipe wall, the roughness is caused by microscopic and/or larger pits, scratches, and other imperfections in the pipe wall which result during the manufacture of the pipe or from corrosion, abrasion, and the like during use. At the gas/liquid interface, waves are present which given the appearance of a rough surface. It has been found that the higher the value of the roughness, the more friction or drag flowing fluids will encounter in the pipeline and the greater the pressure drop of the flow. The pressure drop generated as fluid flows through a pipe is an unwelcome culprit that creates bottlenecks, interferes with fluid flow and increases production costs substantially.

To compensate for these pressure losses, pump and/or compressor stations are spaced along the pipeline to boost the pressure of the flowing fluids to a desired flow rate and to insure that the fluids will reach their destination. Due to the high costs associated with installing, maintaining, and operating such booster stations, other techniques have developed to reduce the friction or drag of fluids with pipelines as discussed below.

The current art for reduction of pressure drop in a fluid circulating in a pipe includes use of a porous inner wall within a metal pipe that allows fluid to circulate in the porous inner layer to limit the pressure drop as reported in U.S. Pat. No. 6,732,766 B2 to Charron. The Charron arrangement would substantially increase the cost and manufacture of the pipe used to convey fluids.

Rojey in U.S. Pat. No. 5,896,896 describes a pipeline wherein the pipe has a porous structure or lining into which a fluid is injected. The injected fluid is retained in the pores and is at least partially immiscible with the fluid being conveyed. The fluid retained in the pores serves as a lubricant and reduces pressure drop of fluid flowing through the pipeline. The drawback of this system is that the porous lining and injected lubricant must be adjusted to receive hydrophilic or oleophilic fluids.

U.S. Pat. No. 5,220,938 to Kley uses a friction reducing material, which includes polymeric material, liners and liners with riblets to reduce pressure drops generated by fluid flow; such materials can be an expensive addition to a pipeline.

Lowther in U.S. Pat. No. 4,958,653 describes the use of hydrocarbon drag reducers and the monitoring of pressure drop between a first point and a second point wherein the injection rate of the drag reducer is adjusted to provide the maximum flow rate with a minimum amount of drag reducer.

None of the prior art references use surfactant incorporated nano particles to reduce pressure drop and thereby increase or improve the flow rate of fluids in a pipeline. Thus, the novel product of the present invention meets a commercial need for an efficient, inexpensive product and system to reduce friction, which occurs between a fluid in a state of flow and the wall of a pipe or vessel in which it is being conveyed.

SUMMARY OF THE INVENTION

It is a primary objective of the present invention to provide a method and composition of matter for reducing the pressure drops generated as a fluid flows through a pipe.

A second objective of the present invention is to provide passive control of fluid flow by introducing a surfactant incorporated nano ceria particle into a fluid flowing through a pipe.

A third objective of the present invention is to provide a surfactant incorporated nanostructure for pressure drop reduction in oil and gas pipelines.

A fourth objective of the present invention is to provide a surfactant incorporated nanostructure that can act as a corrosion inhibitor.

A fifth objective of the present invention is to provide a ceria nanoparticle mixture with organic surfactants that reduces wall friction by lowering the absolute roughness of the pipe wall.

A sixth objective of the present invention is to provide a ceria nanoparticle mixture with organic surfactants that reduces interfacial friction at the gas/liquid interface.

Preferred embodiments of the invention include a two-step process consisting of a first step of using a microemulsion technique to prepare a non-agglomerated mixture of surfactant incorporated nano ceria particles suspended in a non-polar hydrocarbon solvent, such as toluene, and a second step of spraying the nano ceria mixture onto single phase or multiphase (gas, liquid, semi-solid) fluid in pipelines to reduce the pressure drop along the pipeline. The toluene-surfactant-nanoceria mixture, hereinafter called, "nanoceria mixture" helps reduce the wall and interfacial friction factors by lowering the absolute roughness at the pipe wall and reducing the interfacial friction at a gas/liquid interface. Since only nanolayers of the mixture are deposited, very little of the nanoceria mixture is needed to treat long length pipelines; thus, providing a great economical benefit.

A preferred method of providing non-agglomerated, nanosized particles, suspended in a non-polar hydrocarbon solvent, which uniformly incorporates a surfactant and reduces pressure drop of fluid streams in pipelines, includes preparing an aqueous solution of a rare earth metal salt, dissolving a surfactant in a nonpolar hydrocarbon solvent, combining the aqueous solution of the rare earth metal salt with the nonpolar solvent and surfactant into a mixture, stirring the mixture to form micelles, treating the micelles with hydrogen peroxide, allowing nucleation and growth of nano-particles of a rare earth metal oxide, and introducing the rare earth metal oxide nano-particle reaction product into a pipeline.

The preferred rare earth metal salts are cerium salts, ceria doped with lanthanum salts and mixtures thereof. The more preferred rare earth metal salt is cerium nitrate.

The preferred non-polar solvent for suspending the rare earth metal salt and dissolving the surfactant is a hydrocarbon, namely toluene and octane. The preferred surfactant is sodium bis(2-ethylhexyl) sulfosuccinate (AOT). The preferred non-polar solvent is also a carrier liquid for the rare earth metal oxide nano-particles that can be sprayed onto a fluid stream in a pipeline.

A preferred method for decreasing pressure drop generated by fluid flow in a pipeline, includes providing a pipeline having roughness on the inner wall, conveying a fluid stream in the pipeline, providing a gas/liquid interface having an interfacial roughness, spraying a mixture of nano-sized cerium oxide particles onto the fluid stream, and monitoring the flow rate of the fluid. A more preferred method includes using a surfactant in the mixture of nano-sized cerium oxide particles. The preferred nano-sized cerium oxide particles are in a size range from approximately 3 nanometers (nm) to approximately 7 nanometers (nm) in diameter, more preferably, in a size range between approximately 2 nanometers (nm) to approximately 5 nanometers (nm) in diameter. The preferred surfactant is sodium bis(2-ethylhexyl) sulfosuccinate (AOT).

The preferred fluid being conveyed in the pipeline consists of a single phase fluid and a multiphase fluid. The preferred single phase fluid is gas, water, and fluid hydrocarbons. The preferred multiphase fluids are combinations of gas/liquid, gas/solid, liquid/liquid, or gas/liquid/solid phases.

A preferred composition of matter consists of a suspension of cerium oxide nanoparticles in non-polar hydrocarbon solvent that is useful in reducing the pressure drop in oil and gas pipelines. The composition of matter further includes a surfactant, such as, sodium bis(2-ethylhexyl) sulfosuccinate (AOT). The preferred non-polar hydrocarbon solvent is toluene.

Further objects and advantages of this invention will be apparent from the following detailed description of the presently preferred embodiments, which are illustrated schematically in the accompanying drawings.

DESCRIPTION OF THE PREFERRED EMBODIMENTS

Figures 1A, 1B, 1C:
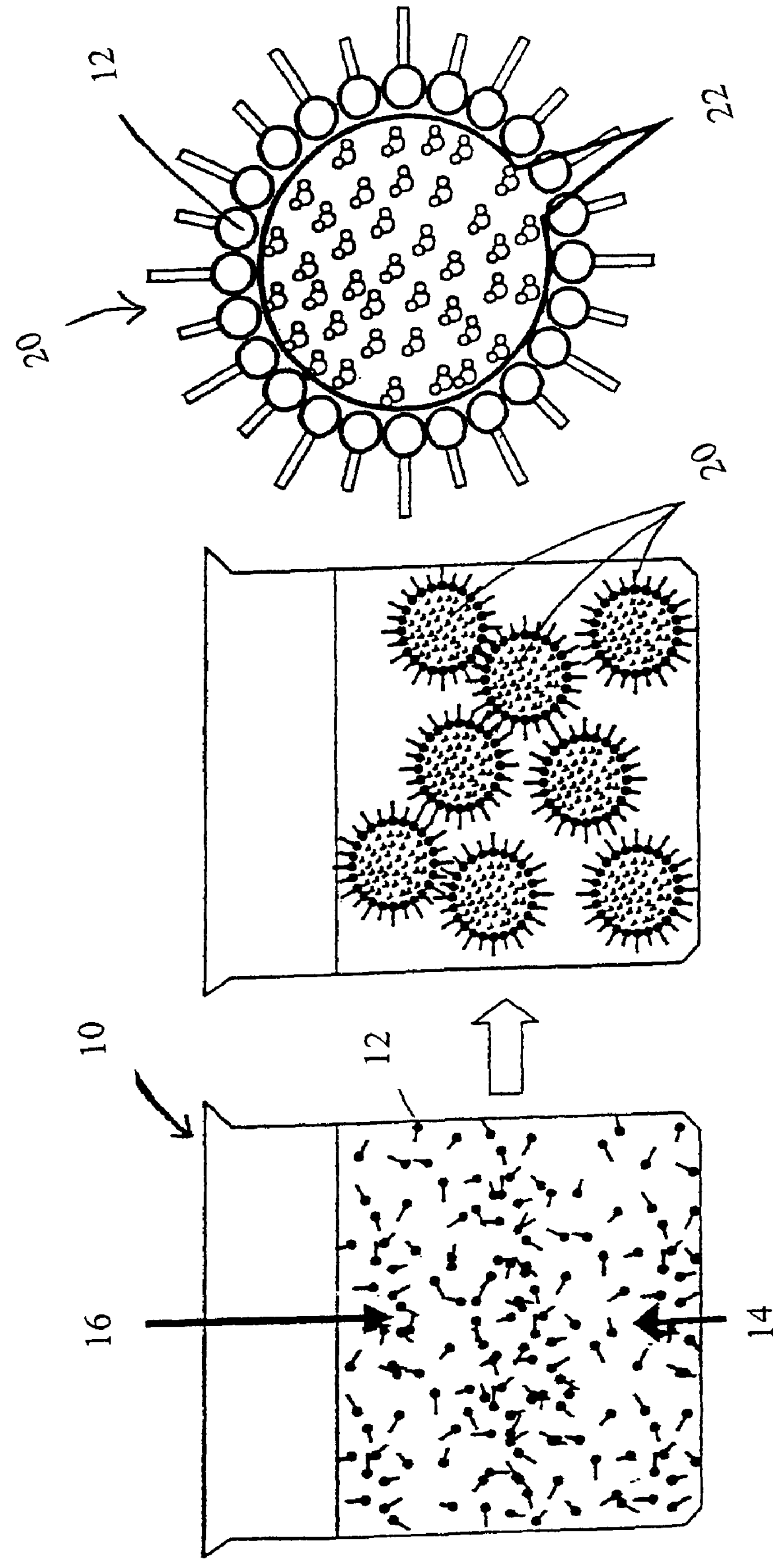
FIG. 1A shows an initial step of adding aqueous cerium nitrate to a non-polar solution with a surfactant to form reverse micelles for the synthesis of ceria nanoparticles.
FIG. 1B shows the formation of nano-sized micelles.
FIG. 1C is an enlarged drawing of one micelle showing an aqueous precursor solution surrounded by coordinated surfactant molecules.

Before explaining the disclosed embodiments of the present invention in detail, it is to be understood that the invention is not limited in its application to the details of the particular arrangements shown since the invention is capable of further embodiments. Also, the terminology used herein is for the purpose of description and not of limitation.

Acronyms used throughout the description of the present invention are defined as follows:

AOT refers to sodium bis(2-ethylhexyl) sulfosuccinate, a surfactant supplied by Aldrich Chemical Company, Inc., Milwaukee, Wis.

$Ce(NO_3)_3$ refers to cerium nitrate.

$H_2O_2$ refers to hydrogen peroxide.

HRTEM refers to high resolution transmission electron microscopy, a technique for examining nano-sized ceria particles, in size, shape and structure.

RM refers to reverse micelles, a microemulsion technique for synthesizing rare earth metal oxide particles less than 10 nanometers (nm) in diameter.

According to the present invention, the objectives stated above are met by preparing agglomerate-free, nanoceria particles, suspended in a compatible medium, then spraying the nanoceria mixture onto a fluid stream (gas, liquid or semi-solid) to reduce the roughness of the inside surface of pipe being used to transport the fluid. Also, if there is a mixture of fluids, for example both gas and liquid flowing in a pipeline, the interfacial friction between the two fluids is decreased when the nanoceria mixture is injected into the pipeline.

For purposes of illustrating the present invention, but not as a limitation, ultrafine nanoparticles of ceria having a diameter less than 10 nanometers (nm), preferably in a range from 3 nm to approximately 9 nm, are produced using an emulsion technique described below. To avoid agglomeration, sodium bis (2-ethylhexyl)sulfosuccinate (AOT), a surfactant, is added, and the nanoparticles are suspended in toluene for delivery. The surfactant has a dual function; first, to prevent agglomeration of the nano particles and second, to function as the carrier fluid for the ceria nanoparticles. The nanoceria mixture is injected into both dry gas and multiphase pipelines and the pressure gradient is measured and compared to the pressure gradient without the nanoceria mixture. The pressure gradient is decreased by 10-30% depending on the gas velocity, roughness of the pipe, and the relative flowrates of the gas and liquid. Further spraying reduced the pressure gradient even further. Previous technologies could only reduce the pressure gradient by 5-15% as discussed by Chen et al. in Paper 00073, *Corrosion* 2000, *NACE International Annual Conference*. The significant decrease in pressure gradient means better recovery and yield of the gas or other fluid flowing though the pipeline.

In the present invention, the surfactant incorporated engineered oxide nanoparticles can be generally prepared by mixing, with continuous agitation, an aqueous solution of rare earth metal salt, e.g., a carbonate, nitrate, sulfate, chloride salts and the like, in the surfactant dissolved in a hydrocarbon solution. The hydrocarbon is a non-polar solvent such as toluene, octane and higher-octane compounds and can be any of the broad class of saturated hydrocarbons that form a compatible chemical solution wherein the nanoparticles are suspended and evenly dispersed without agglomeration or settling. After mixing the aqueous solution of rare earth metal salt, surfactant and non-polar solvent, the dropwise addition of hydrogen peroxide causes the formation of the oxide nanoparticles capable of significant pressure drop reductions in pipelines conveying fluids.

FIGS. 1A, 1B, 1C and 2 illustrate how the nanoceria particles are engineered. In FIG. 1A, a mixing vessel 10, contains approximately 0.5 grams (gm) of surfactant (AOT) 12 that is dissolved in 50 milliliters (ml) of toluene 14 and approximately 2.5 ml of approximately 0.1 mole (M) cerium nitrate aqueous solution 16 is added. FIG. 1B shows several micelles of AOT molecules 20 are formed due to the polarity of the aqueous solution. FIG. 1C is an enlarged view of micelle 20 showing an aqueous precursor solution 22 surrounded by surfactant molecules 12 forming a nano particle.

Figure 2:
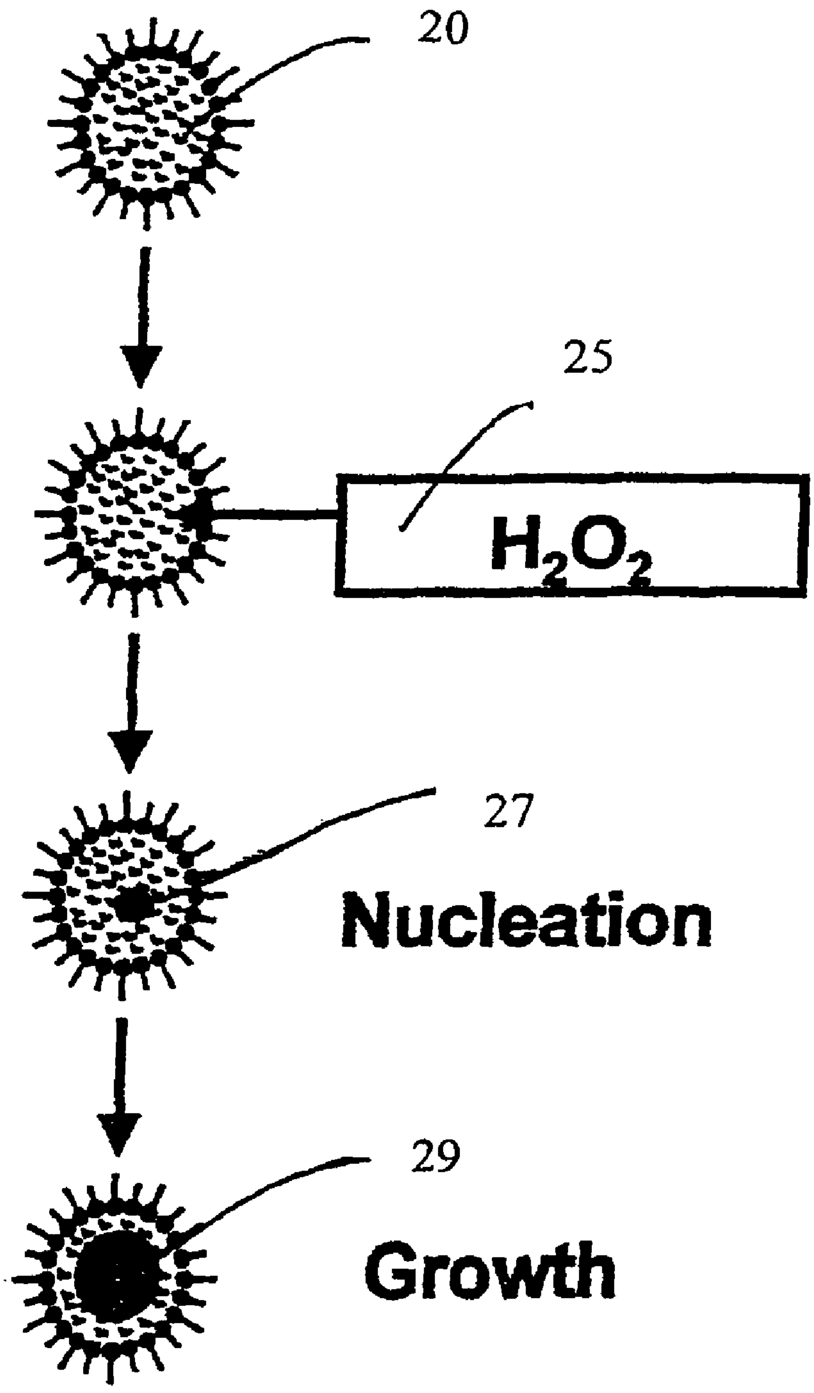
FIG. 2 shows the sequence of particle formation in the synthesis of ceria nanoparticles that are less than 10 nanometer (nm) in diameter; preferably in a range from approximately 4 nm to approximately 7 nm in diameter.

The stepwise sequence of cerium oxide nanoparticle formation by single microemulsion process is shown in FIG. 2. Starting with a micelle 20, 7.5 ml of 30% hydrogen peroxide ($H_2O_2$) 25 is added to begin nucleation 27 and growth 29 in the process to synthesize cerium oxide nanoparticles. The solution obtained by the microemulsion process is used as is; no separation or other processing is involved.

EXAMPLE

Preparation of Nano Ceria Mixture

Cerium oxide nanoparticles of a size approximately 2 nm to approximately 10 nm in diameter, are prepared by a process including the steps of dissolving approximately 0.5 grams to approximately 1.0 grams of $Ce(NO_3)_3.6H_2O$ in deionized water to make approximately 10 mls of solution to form a first solution, followed by dissolving approximately 3 grams to approximately 4 grams of AOT (surfactant) in approximately 200 ml of solvent to form a second solution, followed by combining the first and the second solutions, followed by stirring the combined solutions for approximately 30 minutes, and drop wise adding approximately 30% hydrogen peroxide ($H_2O_2$) until the stirred combined solution becomes yellow, and subsequently stirring for approximately 30 minutes to approximately 60 minutes more.

Thus, aqueous reverse micelles (RMs) formed of surfactant aggregates in nonpolar solvents that enclose packets of aqueous solution in their interior. The size of the water droplet can be tuned by varying the ratio of water to surfactant. RMs are used as reaction media in the production of nanoparticles whose size and shape are controlled by water and surfactant ratio.

Figure 3:
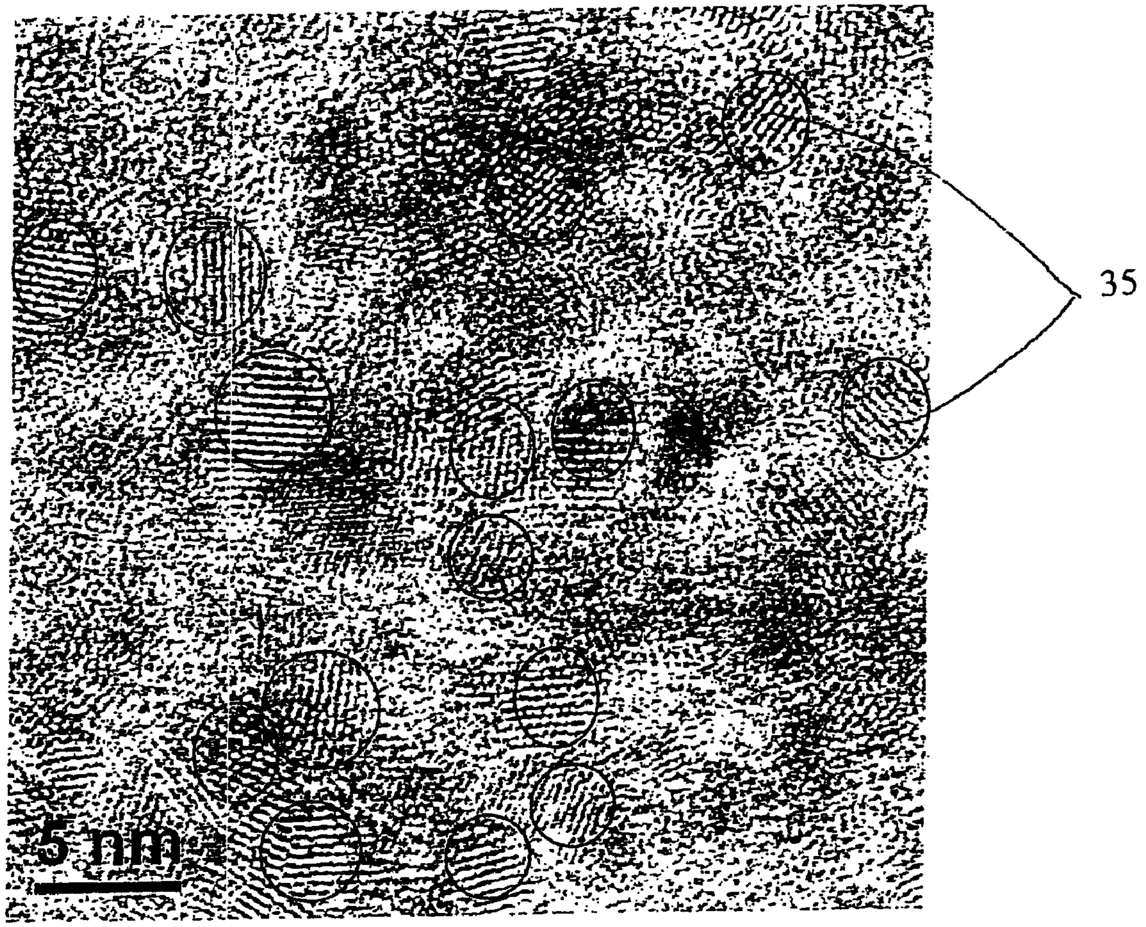
FIG. 3 is high resolution transmission electron microscopy (HRTEM) image of non agglomerated ceria particles having spherical morphology with particle size of approximately 5 nanometers (nm) in diameter for non-agglomerated ceria sol prepared and stabilized using hydrogen peroxide.

FIG. 3 is an HRTEM image of ceria nanoparticles, prepared by the microemulsion technique described above. The HRTEM image shows spherical particle 35 morphology with uniform particle size distribution. The ceria nano particles are less than 10 nanometers (nm) in diameter, preferably in a range from approximately 2 nm to approximately 9 nm with a mean size of approximately 5 n.

Figure 4:
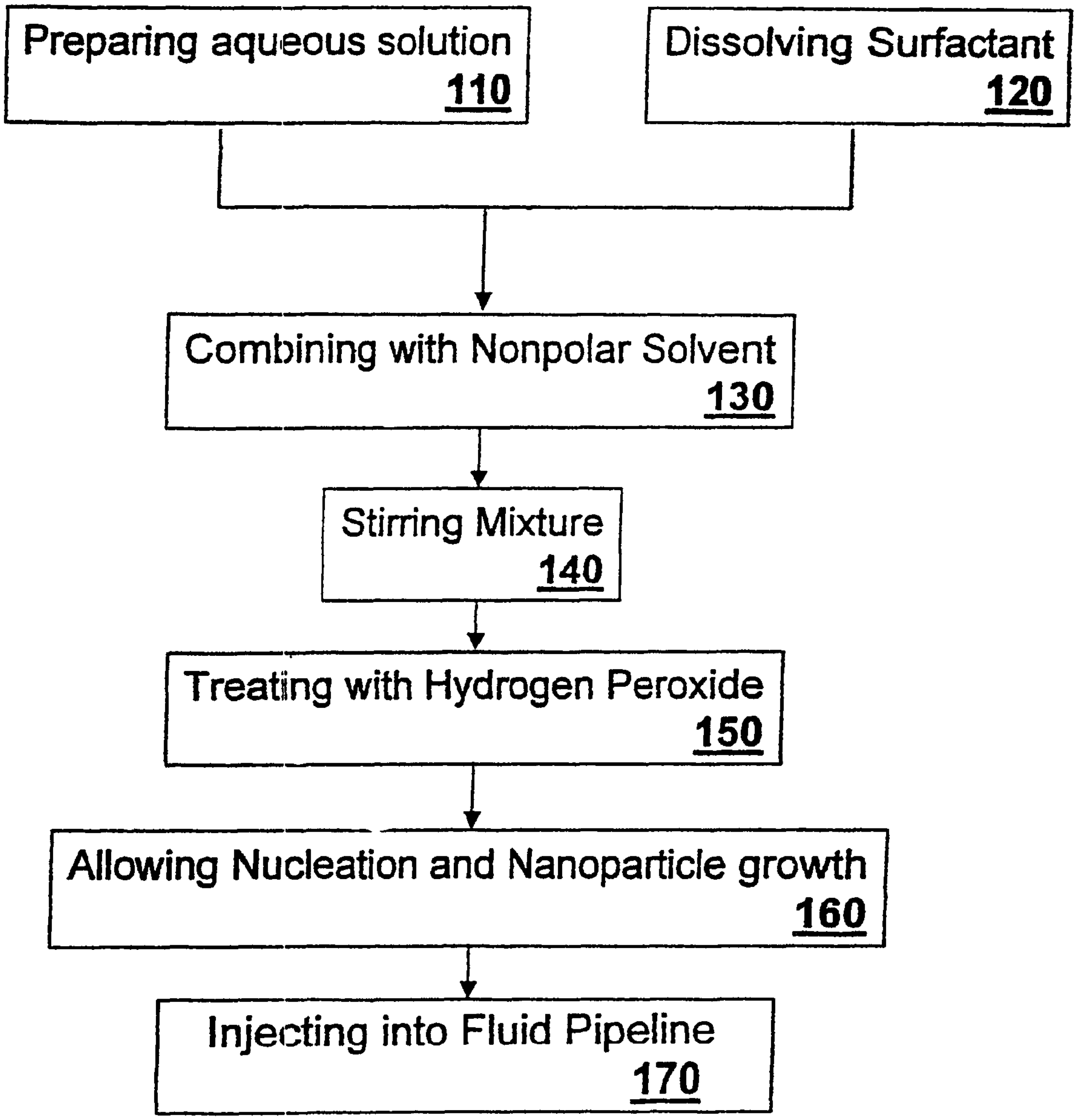
FIG. 4 is a flowchart of method steps of providing nano-sized particles in a of toluene for use as a pressure drop reduction pipeline additive.

FIG. 4 is a flowchart of method steps of providing nano-sized particles into a pipeline. The method can include an efficient method of providing nano-sized particles, that are non-agglomerated and suspended in a nonpolar solvent, then injected into a fluid pipeline. The method steps can include the steps of preparing an aqueous solution of a rare earth metal salt 110 and dissolving a surfactant in a nonpolar solvent 120, and combining the aqueous solution of the rare earth metal salt with the nonpolar solvent and surfactant 130. Next, the mixture is sired to form micelles 140, followed by treating the micelles with hydrogen peroxide 150, and allowing nucleation and growth of nano-particles of a rare earth metal oxide 160, and injection the rare earth metal oxide nano-particle reaction product ("nanoceria mixture") into fluid flowing through a pipe 170.

Figure 5:
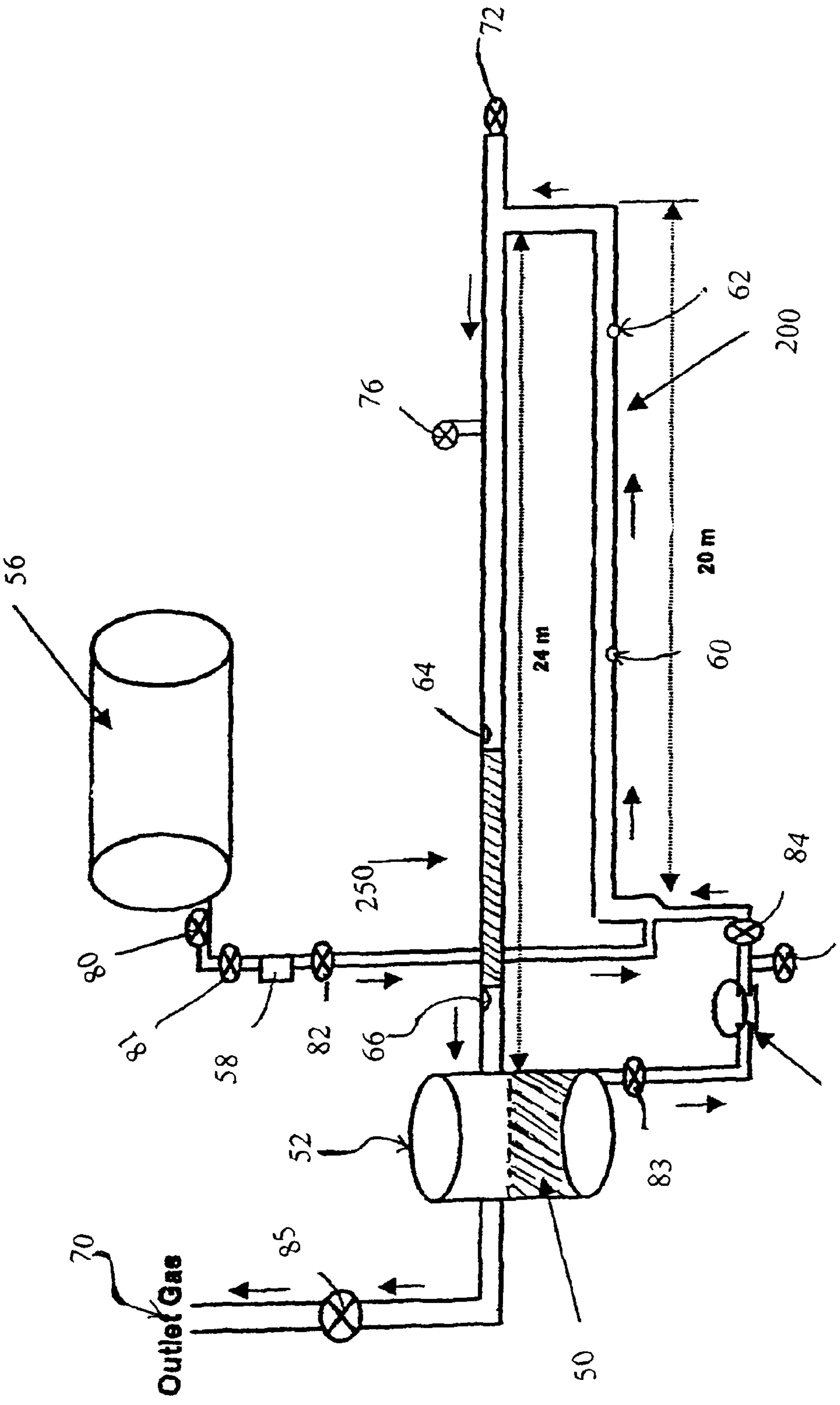
FIG. 5 is an experimental layout of a fluid flow loop.

In a multiphase flow loop shown in FIG. 5, the fluid 50 can be either single phase, such as, gas, aqueous or hydrocarbon (non-aqueous), or combinations of phases, such as, gas/liquid, gas/solid, liquid/liquid, or gas/liquid/solid. The liquid mixture is either water and/or oil and is placed in storage tank 52. If solids are required, they are also inserted with the liquid 50. The flow loop has a pump 54 to circulate fluid in the pipeline, a drain valve 74 and valves 80, 81, 82, 83, 84 and 85 are at strategic locations for safety and control of fluids from storage vessel to outlet pipe. Fluid 50 is pumped into a 20-meter long Plexiglas pipe 200.

To mimic the conditions for gas lines, carbon dioxide gas from a second storage tank 56 is added to the pipeline 200, using gas flow meter 58. The mixtures flow along the pipeline 200. The pressure gradient is measured as the fluid passes through the Plexiglas section of pipe, using pressure tappings 60, 62 on each side of the pipeline 200. The mixture 50 then flows around a loop and back into the liquid storage tank 52 after traveling along a 24 meter return loop having a pigging port 72 at an end opposite the storage tank 52, a chemical injection port 76 for the introduction of the surfactant incorporated nanoparticles, and a section of metal pipe 250 for determining pressure drop reduction. The metal pipe section 250 has pressure tappings 64 and 66 on each side of the pipe section 250.

When liquid flowing through the pipeline 200 and section 250 reaches the liquid storage tank 52, the liquid is separated and the gas vented to the atmosphere via outlet pipe 70. All types of liquids and gases can be used in the multiphase flow loop.

Figure 6:
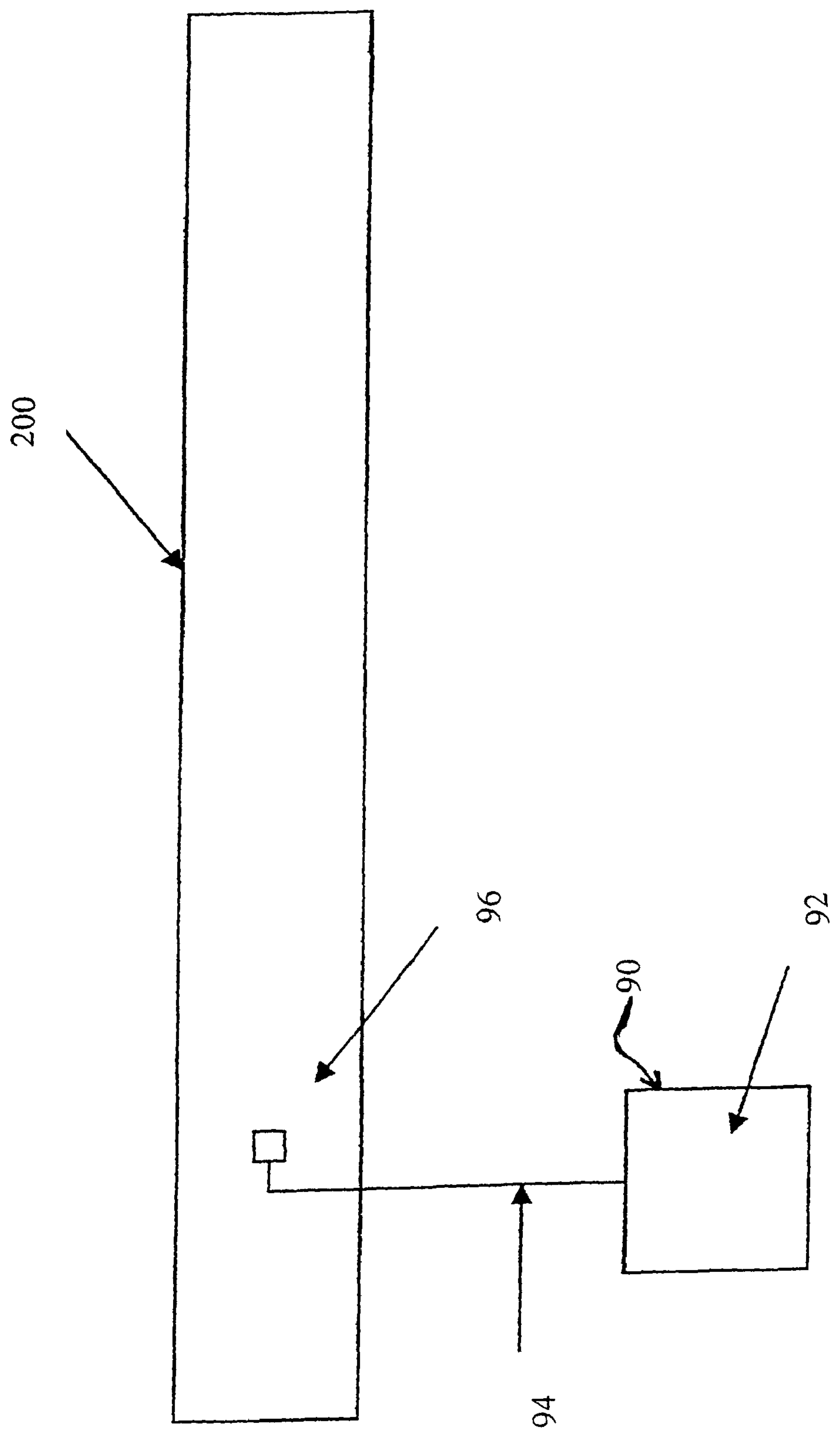
FIG. 6 is the layout of a nanoceria mixture storage vessel and the injection port of a pipeline.

FIG. 6 shows an arrangement of the pressurized nanoparticle storage vessel 90 containing a nanoceria mixture 92, connected by a hose or other conduit 94 to a spray nozzle 96 located at injection port 76 (shown in FIG. 5) along pipeline 200.

Figure 7:
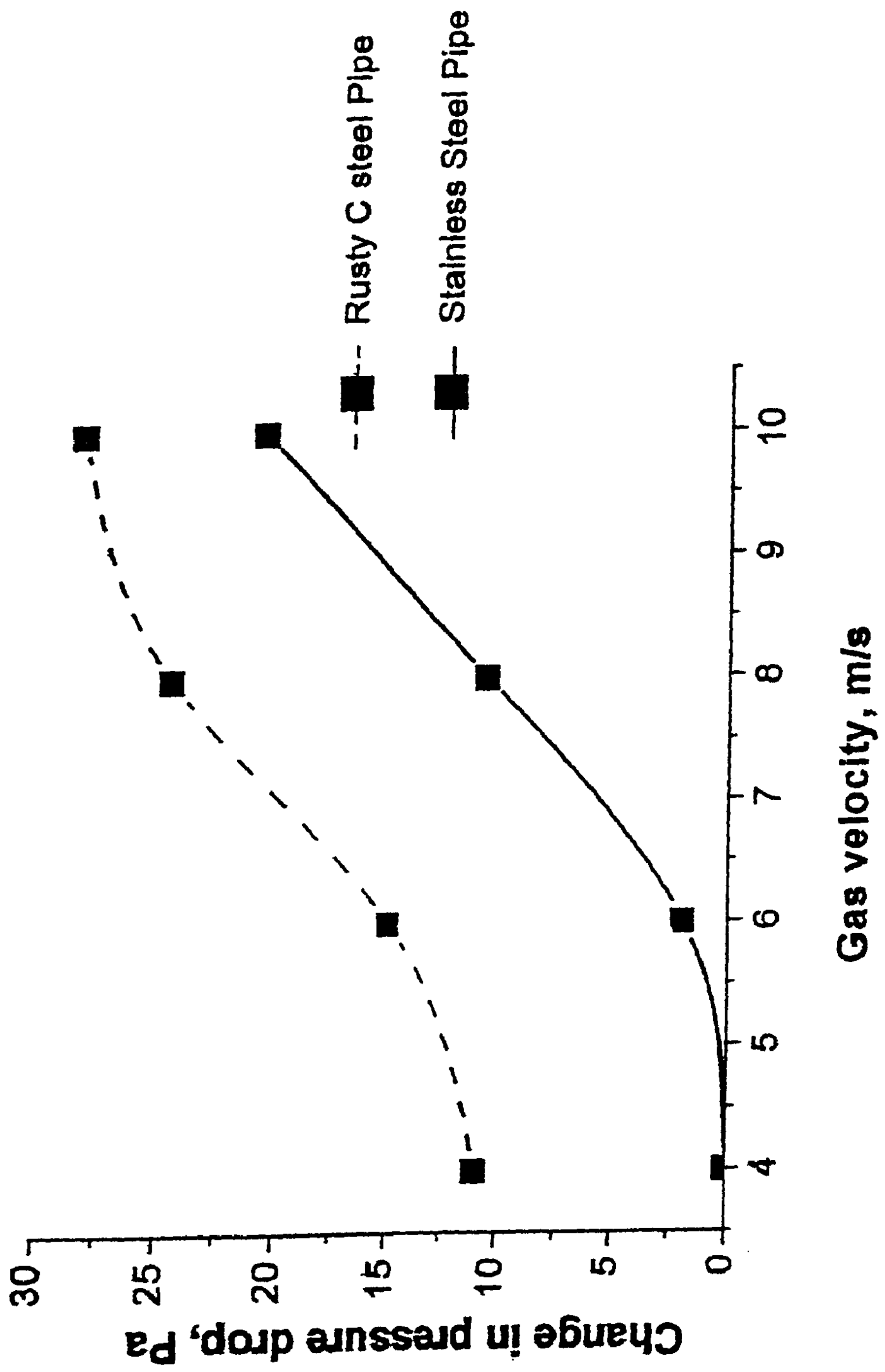
FIG. 7 is a graph of pressure drop measurements in a stainless steel pipe and a rusty carbon steel pipe.

FIG. 7 shows changes in pressure drop (Pa) for a smooth, stainless steel pipe, and a rough, rusted carbon steel pipe. The pressure drop is measured across the metal pipe. For the rough pipe, the friction is high due to the high roughness of the pipe and hence the pressure drop is high. When the nanoparticles are injected, immediately the pressure drop decreases by 10 to 25 Pa, which ranges from 6-18% decrease from baseline conditions. The highest performance is at the higher gas velocities. For the smoother stainless steel pipe, the effectiveness of injecting nanoparticles is minimal below 6 meters per second (m/s) flow rate. However, above this gas velocity, the effectiveness again increases to about 15-20% pressure drop decrease from baseline conditions. It is noted that the nanoparticles move in the direction of the pipe wall and help reduce the roughness there by filling in the imperfections in the pipe wall surface.

The following methods and techniques can be used to introduce the nanoceria mixture of the present invention to pipelines carrying compatible fluids. Compatible fluids are defined as those that are not degraded in anyway by the nanoceria mixture. The compatible fluids may be gases, liquids, semi-solids (i.e., solids mixed with liquids) or mixtures thereof. Further, the compatible fluids can flow in single phase or multiphase. A single-phase system is used to transport a single fluid, the fluid in the pipeline is considered to be homogeneous. The multiphase system transports both liquid and gaseous phases of fluid in the same pipe; the two phases tend to undergo separation because of gravity, particularly at low flow rates, with the liquid tending to flow in the lower part of the pipe and the gas in the upper part.

The present invention provides a composition of matter for innovative oil and gas recovery; improves production efficiency in all industries, using pipelines to transport fluids that are not compromised by the addition of a nanolayer of the nanoceria mixture.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A pressure drop reduction pipeline additive in the form of a microemulsion reaction mixture consisting essentially of:

a non-polar solvent;

reverse micelles uniformly suspended in the non-polar solvent, said reverse micelles formed by surfactant molecules enclosing an aqueous solution of a rare earth metal salt in interior of the reverse micelles;

hydrogen peroxide mixed into the non-polar solvent with suspended reverse micelles; and rare earth metal oxide nanoparticles formed by nucleation and growth inside the reverse micelles in the presence of the hydrogen peroxide.

2. The pressure drop reduction pipeline additive of claim 1, wherein said rare earth metal oxide nanoparticles have a diameter less than 10 nanometers.

3. The pressure drop reduction pipeline additive of claim 2, wherein said rare earth metal oxide nanoparticles have a diameter from about 2 to about 9 nanometers.

4. The pressure drop reduction pipeline additive of claim 1, wherein said rare earth metal salt includes cerium salts.

5. The pressure drop reduction pipeline additive of claim 4, wherein said rare earth metal salt includes a carbonate, nitrate, sulfate or chloride salt.

6. The pressure drop reduction pipeline additive of claim 4, wherein said rare earth metal salt is cerium nitrate.

7. The pressure drop reduction pipeline additive of claim 1, wherein the surfactant is sodium bis(2-ethylhexyl) sulfosuccinate.

8. The pressure drop reduction pipeline additive of claim 1, wherein the non-polar solvent is a hydrocarbon solvent.

9. The pressure drop reduction pipeline additive of claim 1, wherein the non-polar solvent is toluene or octane.

10. The pressure drop reduction pipeline additive of claim 1, wherein the pressure drop reduction pipeline additive enables reduction of pressure drop along a pipeline conveying a fluid.

11. The pressure drop reduction pipeline additive of claim 10, wherein the fluid is a gas, a liquid including water or fluid hydrocarbons, a semi-solid fluid, or mixtures thereof.

12. The pressure drop reduction pipeline additive of claim 10, wherein the fluid is a single phase fluid or a multiphase fluid including gas/liquid, gas/solid, liquid/liquid, or gas/liquid/solid phases.

13. The pressure drop reduction pipeline additive of claim 1, wherein the pressure drop reduction pipeline additive enables reduction of wall friction of the pipeline, or reduction of interfacial friction at a gas/liquid interface.

14. The pressure drop reduction pipeline additive of claim 1, wherein the pressure drop reduction pipeline additive enables inhibition of corrosion.

15. A pressure drop reduction pipeline additive in the form of a microemulsion reaction mixture consisting essentially of:

a non-polar solvent;

reverse micelles uniformly suspended in the non-polar solvent, said reverse micelles formed by surfactant molecules enclosing an aqueous solution of a cerium nitrate in interior of the reverse micelles;

hydrogen peroxide mixed into the non-polar solvent with suspended reverse micelles; and cerium oxide nanoparticles formed by nucleation and growth inside the reverse micelles in the presence of the hydrogen peroxide.

16. The pressure drop reduction pipeline additive of claim 15, wherein said cerium oxide nanoparticles have a diameter less than 10 nanometers.

17. The pressure drop reduction pipeline additive of claim 15, wherein the surfactant is sodium bis(2-ethylhexyl) sulfosuccinate.

18. The pressure drop reduction pipeline additive of claim 15, wherein the non-polar solvent is a hydrocarbon solvent.

19. The pressure drop reduction pipeline additive of claim 15, wherein the non-polar solvent is toluene or octane.

20. The pressure drop reduction pipeline additive of claim 15, wherein the pressure drop reduction pipeline additive enables reduction of pressure drop along a pipeline conveying a fluid.

* * * * *